(12) United States Patent
Wu et al.

(10) Patent No.: US 7,877,124 B2
(45) Date of Patent: Jan. 25, 2011

(54) HANDS-FREE MOBILE PHONE

(75) Inventors: Kuan-Lin Wu, Taipei Hsien (TW);
Wei-Yuan Chen, Taipei Hsien (TW)

(73) Assignee: Hon Hai Precision Industry Co., Ltd.,
Tu-Cheng, Taipei Hsien (TW)

( * ) Notice: Subject to any disclaimer, the term of this patent is extended or adjusted under 35 U.S.C. 154(b) by 551 days.

(21) Appl. No.: 12/051,850

(22) Filed: Mar. 20, 2008

(65) Prior Publication Data

US 2009/0176537 A1 Jul. 9, 2009

(30) Foreign Application Priority Data

Jan. 4, 2008 (CN) .................. 2008 1 0300023

(51) Int. Cl.
*H04M 1/00* (2006.01)
(52) U.S. Cl. ............. 455/575.4; 455/550.1; 379/433.12
(58) Field of Classification Search ... 455/571.1–575.4, 455/550.1; 379/428.01, 433.01, 433.11, 379/433.12, 440
See application file for complete search history.

(56) References Cited

U.S. PATENT DOCUMENTS 6,642,462 B2 * 11/2003 Ninomiya et al. .......... 200/61.7
7,319,891 B2 * 1/2008 Ting ........................ 455/575.3
7,362,373 B2 * 4/2008 Tsai ........................... 348/376
2008/0125171 A1 * 5/2008 Shin ......................... 455/556.1
2009/0318195 A1 * 12/2009 Hiraoka ..................... 455/566

FOREIGN PATENT DOCUMENTS

CN  200520088843.8  6/2006

* cited by examiner

*Primary Examiner*—Nhan Le
(74) *Attorney, Agent, or Firm*—Frank R. Niranjan

(57) ABSTRACT

A hands-free mobile phone includes a housing and a hands-free unit. The housing defines two outer slide channels and two inner slide channels inside the corresponding outer slide channels. Each outer slide channel includes an access hole, a pivot hole, and a coupling passage communicating the access hole with the pivot hole. Two pivot portions are formed on the hands-free unit. Each pivot portion includes a pivot shaft and a plugging end formed on the pivot shaft. The plugging ends of the pivot portions are respectively inserted in the inner slide channels through the access holes of the corresponding outer slide channels and the pivot shafts thereof are respectively placed in the corresponding access holes and slid into the pivot holes of the outer slide channels through the corresponding coupling passages. Thus, the hands-free unit is pivotably secured to the housing via pivot of the pivot portions.

14 Claims, 5 Drawing Sheets

HANDS-FREE MOBILE PHONE

BACKGROUND

1. Field of the Invention

The present invention relates to hands-free mobile phones, and more particularly to a hands-free mobile phone providing with a hands-free accessory.

2. Description of Related Art

At present, mobile phones are widely used. There are large demands for hands-free functions of the phones. For safety, hands-free functions are very important to users when they are driving while using their phones.

What is desired, therefore, is a convenient ease to use hands-free mobile phone.

SUMMARY

An exemplary hands-free mobile phone includes a housing and a hands-free unit pivotably secured to the housing. The housing defines two outer slide channels and two inner slide channels inside the corresponding outer slide channels. Each outer slide channel includes an access hole, a pivot hole, and a coupling passage communicating the access hole with the pivot hole. Two pivot portions are formed on the hands-free unit. Each pivot portion includes a pivot shaft and a plugging end formed on the pivot shaft. The plugging ends of the pivot portions are respectively inserted in the inner slide channels through the access holes of the corresponding outer slide channels, and the pivot shafts thereof are respectively placed in the corresponding access holes and slid into the pivot holes of the outer slide channels through the corresponding coupling passages thereof.

Other advantages and novel features of the present invention will become more apparent from the following detailed description of an embodiment when taken in conjunction with the accompanying drawings, in which:

DETAILED DESCRIPTION

Figure 1:
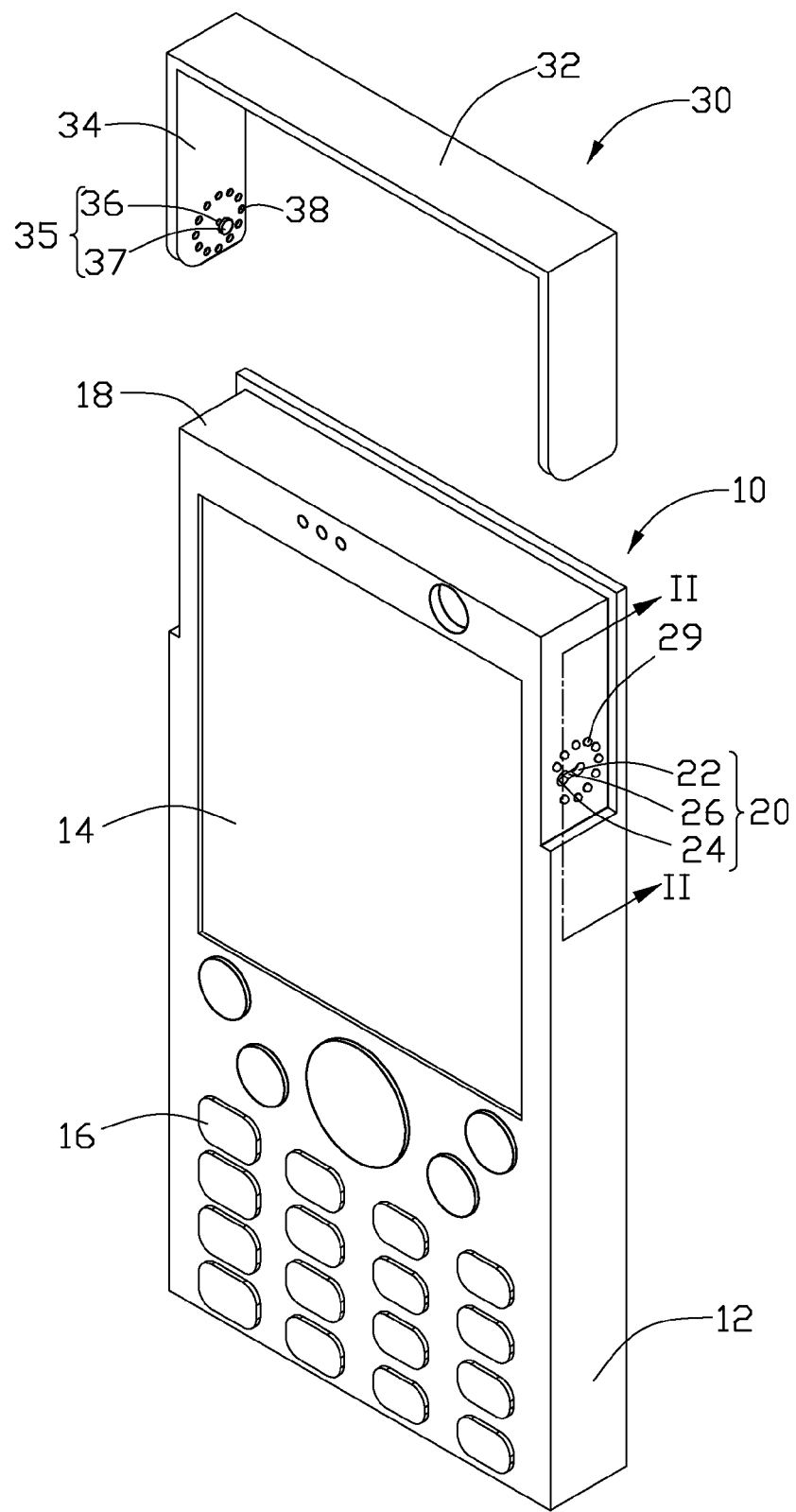
FIG. 1 is an exploded, isometric view of a hands-free mobile phone according to an embodiment, the hands-free mobile phone including a housing and a hands-free unit.
Figure 2:
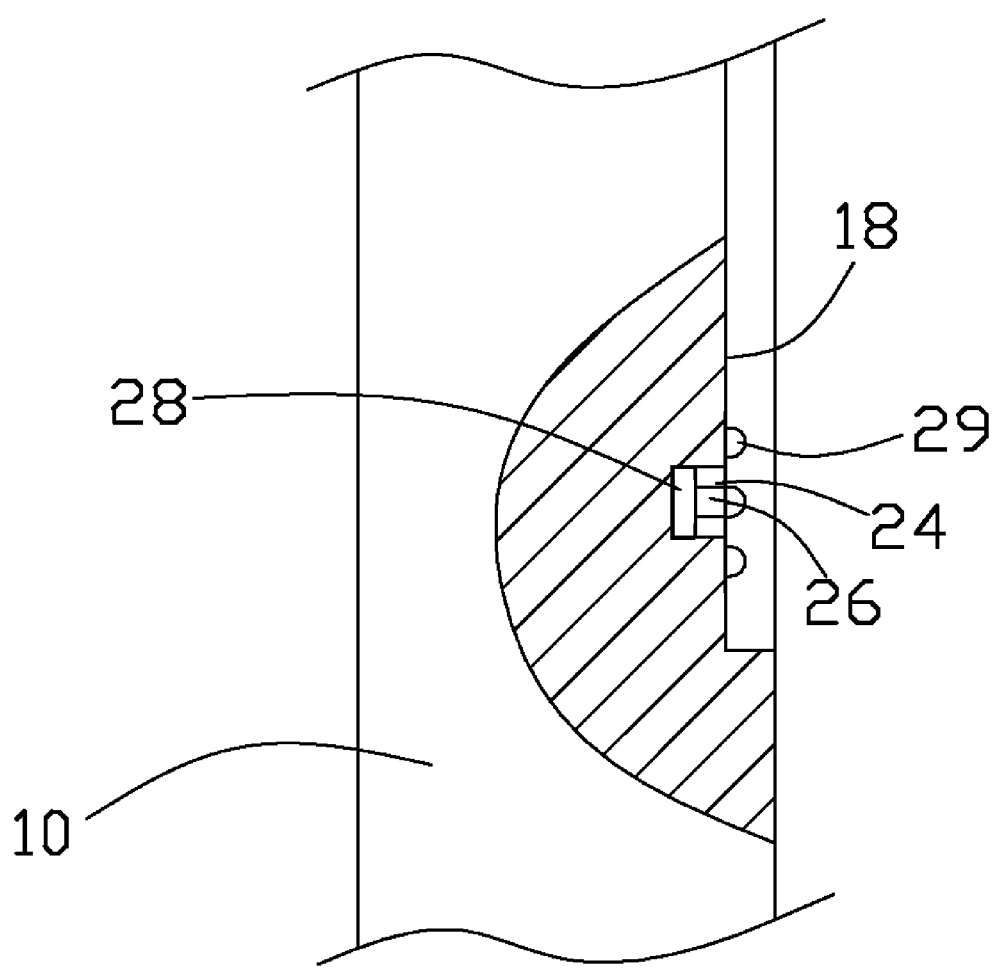
FIG. 2 is a partially cross-sectional view of the housing of FIG. 1 taken along line II-II.

Referring to FIGS. 1 and 2, in an embodiment, a hands-free mobile phone includes a housing 10 and a hands-free unit secured to the housing 10. The hands-free unit is configured to fit over a human ear and support the hands-free mobile therefrom, allowing hands-free use of the mobile phone.

The housing 10 includes a display 14 and a plurality of keys 16 located at an outer surface thereof. A recessed portion 18 is formed in an upper section of the housing and extends along a peripheral profile of the upper section thereof. The recessed portion 18 extends from a top of the upper section toward two lateral sides thereof. Two outer slide channels 20 are respectively defined in two lateral sections of the recessed portion 18. Each outer slide channel 20 has a generally dumbbell-shaped profile, and includes an access hole 24 located at an end thereof, a pivot hole 22 located at the other end thereof, and a coupling passage 26 located between the access hole 24 and the pivot hole 22 for communicating with them. A width of the coupling passage 26 of each outer slide channel 20 is smaller than diameters of the access hole 24 and the pivot hole 22 thereof, and the diameter of the access hole 24 of the outer slide channel 20 is larger than that of the pivot hole 22 thereof. An inner slide channel 28 is defined in the recessed portion 18 inside each outer slide channel 20. A width of each inner slide channel 28 is larger than the diameter of the pivot hole 22 of the corresponding outer slide channel 20 and generally equal to the diameter of the access hole 24 thereof. A plurality of convex projections 29 protrudes from each lateral section of the recessed portion 18 around the pivot hole 22 of the outer slide channel 20.

The hands-free unit is an auxiliary member 30, the shape of which is fittingly engaged in the recessed portion 18 of the housing. The auxiliary member 30 includes a horizontally elongated portion 32 and two side portions 34 extending downwardly from two ends of the elongated portion 32 respectively. A pivot portion 35 protrudes from a lateral surface of each side portion 34. The pivot portion 35 has a T-shaped profile, and includes a pivot shaft 36 corresponding to the pivot hole 22 of one corresponding outer slide channel 20, and a plugging end 37 formed on the pivot shaft 36 corresponding to the corresponding inner slide channel 28. A diameter of the plugging end 37 of the pivot portion 35 is generally equal to the width of the corresponding inner slide channel 28. A plurality of dents 38 is defined in the lateral surface of each side portion 34 around the corresponding pivot portion 35, corresponding to the corresponding convex projections 29 of the housing 10.

Figure 3:
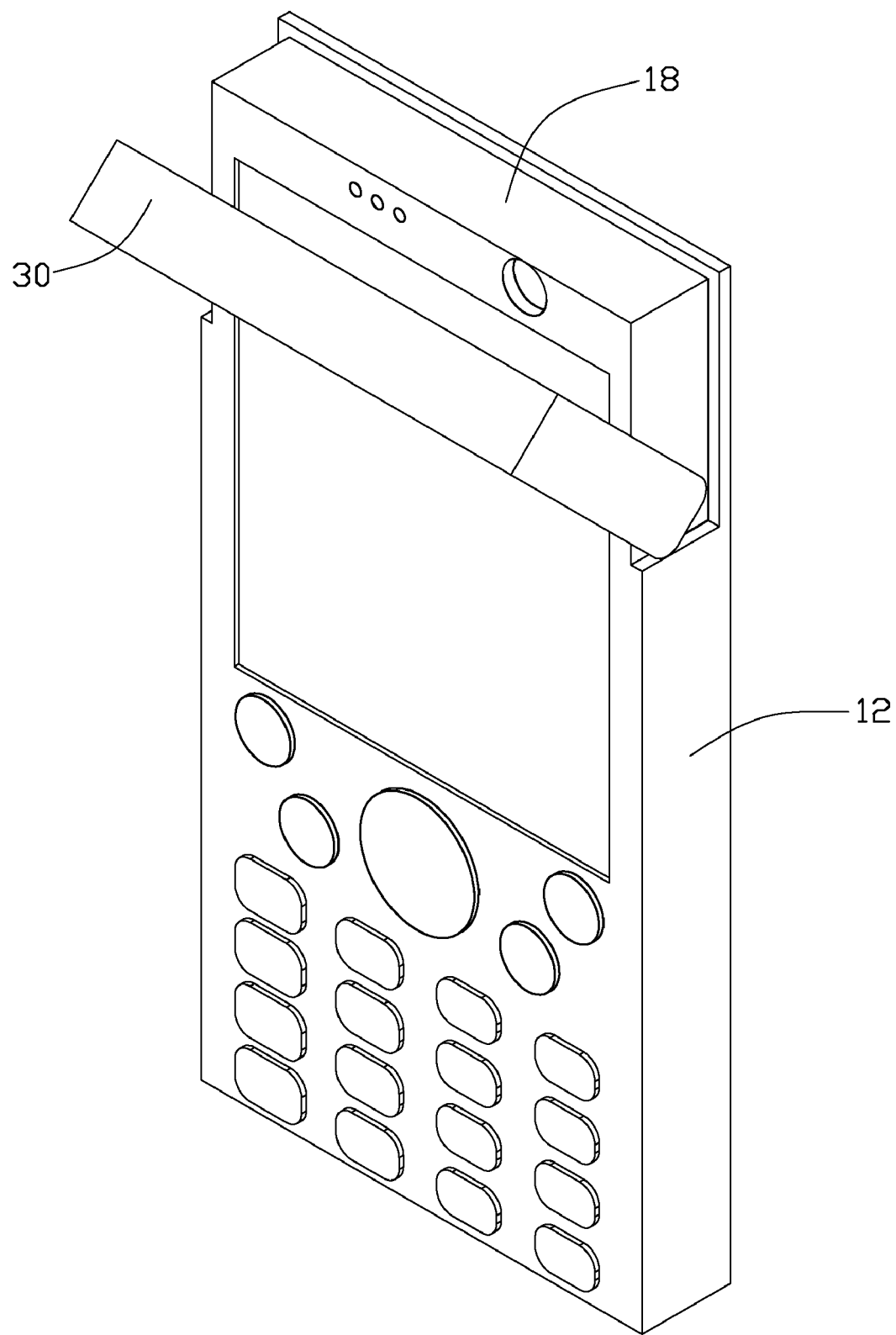
FIG. 3 is an assembled view of FIG. 1, with the hands-free unit in an open position.
Figure 4:
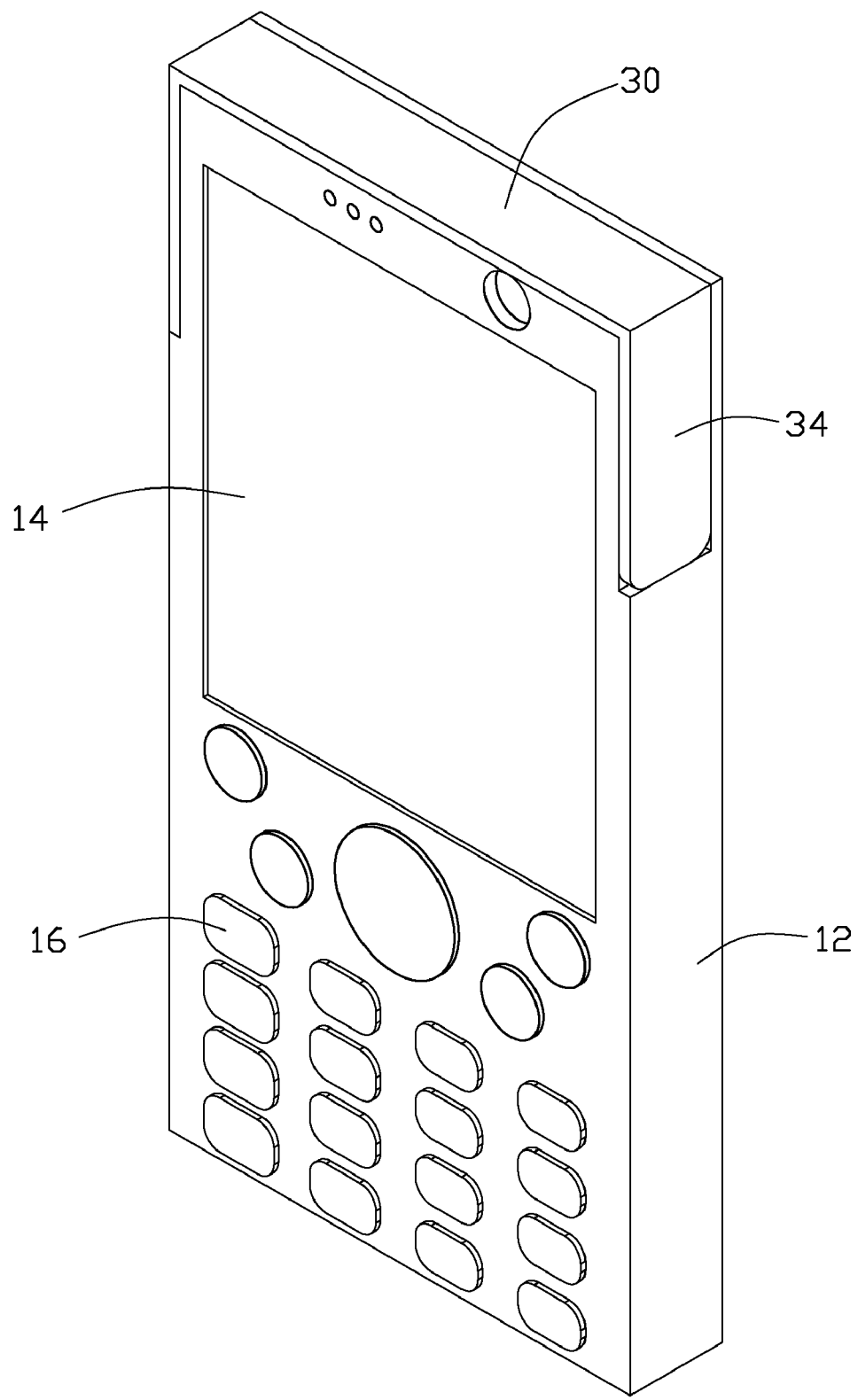
FIG. 4 is an assembled view of FIG. 1, with the hands-free unit in a closed position.

Referring also to FIGS. 3 and 4, in assembly, the side portions 34 of the auxiliary member 30 are resiliently deformed away from each other. The pivot portions 35 of the side portions 34 are respectively aligned with the access holes 24 of the corresponding outer slide channels 20. The side portions 34 of the auxiliary member 30 are restored, and the plugging ends 37 of the pivot portions 35 are respectively inserted in the corresponding inner slide channels 28 through the access holes 24. The side portions 34 of the auxiliary member 30 are pushed forward. The plugging ends 37 of the pivot portions 35 are slid from ends of the corresponding inner slide channels 28 toward the other ends thereof and the pivot shafts 36 thereof are pivotably secured into the corresponding pivot holes 22 of the outer slide channels 20 via the coupling passages 26 thereof respectively. The convex projections 29 of the recessed portion 18 are respectively received in the corresponding dents 38 of the side portions 34. The auxiliary member 30 is rotated toward the recessed portion 18, and the pivot shafts 36 and the plugging ends 37 of the pivot portions 35 are respectively rotated in the corresponding pivot holes 22 of the outer slide channels 20 and the corresponding inner slide channels 28. The convex projections 29 of the recessed portion 18 escape the original dents 38 of the side portions 34 and are subsequently received in the neighboring dents 38. The coupling of the convex projections 29 and the dents 38 prevents the auxiliary member 30 from freely escaping the recessed portion 18. The coupling passages 26 of the outer slide channels 20 prevent the corresponding pivot shafts 36 of the pivot portions 35 from sliding from the pivot holes 22 of the outer slide channels 20 toward the corresponding access holes 24 thereof.

Figure 5:
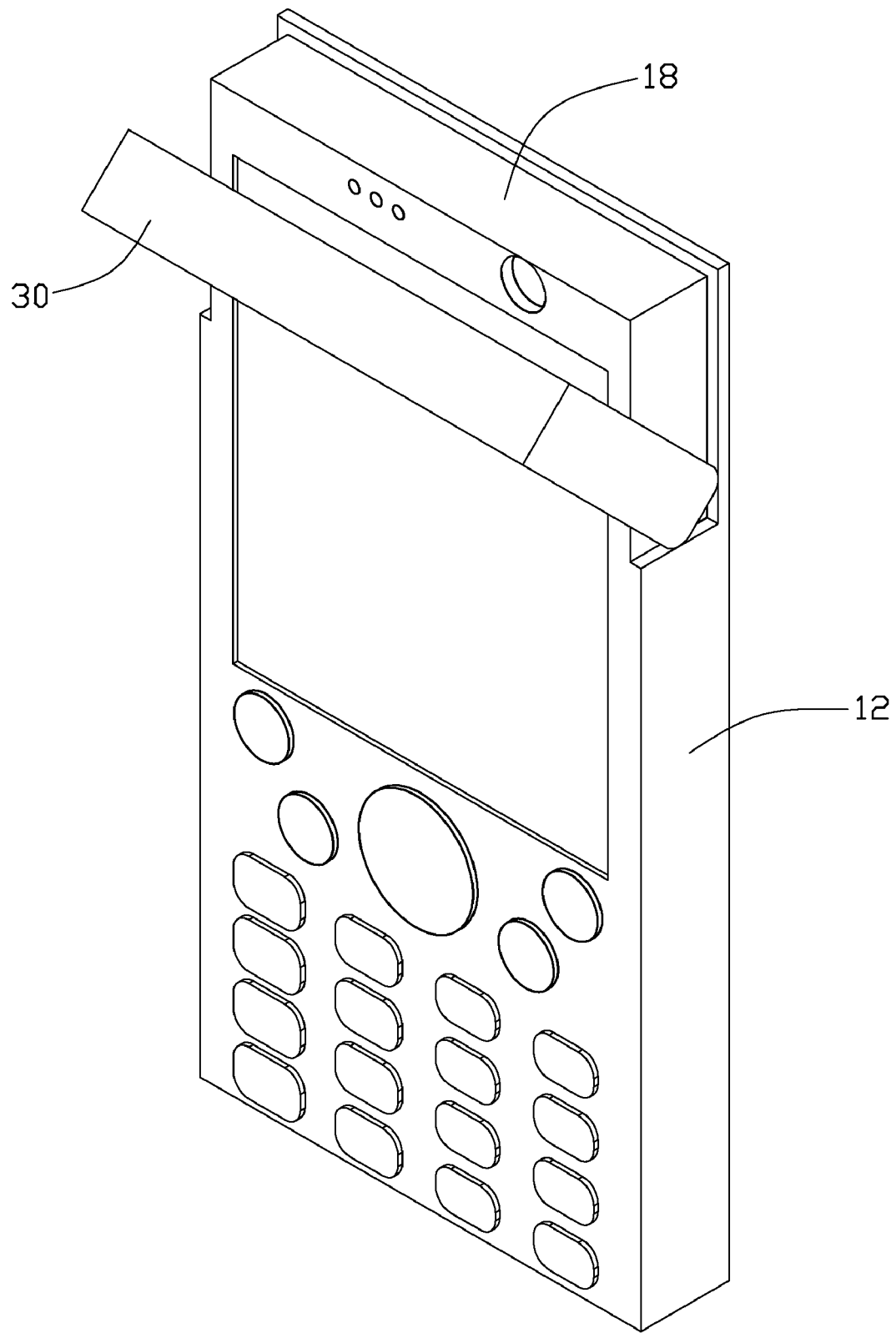
FIG. 5 shows a use state of the hands-free mobile phone, with the hands-free unit at an angle relative to the housing.

Referring to FIG. 5, when there is a call, a user rotates the auxiliary member 30 out from the recessed portion 18 to a position sufficient to allow the auxiliary member 30 to fit over the user's ear and support the hands-free mobile phone therefrom. When the auxiliary member 30 is rotated, the pivot shafts 36 and the plugging ends 37 of the pivot portions 35 respectively rotate in the corresponding pivot holes 22 of the outer slide channels 20 and the corresponding inner slide channels 28. The convex projections 29 escape the original dents 38 of the side portions 34 and are subsequently received in the neighboring dents 38. The coupling of the convex projections 29 and the dents 38 can prevent the auxiliary member 30 from swinging relative to the housing 10 during phone conversations.

When there is no need of the auxiliary member 30, the auxiliary member 30 can be removed from the recessed portion 18 of the housing 10. Thus, the weight of the hands-free mobile phone can be reduced.

Alternatively, the convex projections 29 of the recessed portion 18 may be set on the side portions 34 of the auxiliary member 30, and correspondingly the dents 38 may be defined in the recessed portion 18 of the housing 10. Further, the pivot portions 35 of the auxiliary member 30 may protrude from the recessed portion 18 of the housing 10, and correspondingly the outer and inner slide channels 20, 28 may be defined in the side portions 34 of the auxiliary member 30.

The hands-free unit may have other shapes, such as an inverted L.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hands-free mobile phone comprising:
   a housing defined two outer slide channels and two inner slide channels inside the corresponding outer slide channels, each of the outer slide channels comprising an access hole, a pivot hole, and a coupling passage communicating the access hole with the pivot hole; and
   a hands-free unit forming with two pivot portions, each of the pivot portions comprising a pivot shaft pivotably engaged in the pivot hole of one of the outer slide channels, and a plugging end formed on the pivot shaft and pivotably inserted in the corresponding inner slide channel;
   wherein the plugging ends of the pivot portions are respectively inserted in the inner slide channels through the corresponding access holes of the outer slide channels, the pivot shafts thereof are respectively placed in the corresponding access holes and slid into the pivot holes of the outer slide channels through the corresponding coupling passages thereof, thereby the hands-free unit being secured to the housing.

2. The hands-free mobile phone as described in claim 1, wherein a plurality of dents is defined in the hands-free unit around each of the pivot portions thereof, and a plurality of projections protrudes from the housing around the pivot hole of each of the outer slide channels thereof and movably received in the corresponding dents of the hands-free unit.

3. The hands-free mobile phone as described in claim 1, wherein a plurality of dents is defined in the housing around the pivot hole of each of the outer slide channels thereof, and a plurality of projections protrudes from the hands-free unit around each of the pivot portions thereof and movably received in the corresponding dents of the housing.

4. The hands-free mobile phone as described in claim 1, wherein a width of the coupling passage of each of the outer slide channels is smaller than diameters of the access hole and the pivot hole of the corresponding outer slide channel.

5. The hands-free mobile phone as described in claim 4, wherein the diameter of the access hole of each of the outer slide channels is larger than the diameter of the pivot hole of the corresponding outer slide channel.

6. The hands-free mobile phone as described in claim 5, wherein each of the outer slide channels has a generally dumbbell-shaped profile.

7. The hands-free mobile phone as described in claim 1, wherein a recessed portion is formed in the housing for receiving the hands-free unit therein.

8. The hands-free mobile phone as described in claim 7, wherein the recessed portion of the housing extends from a top of an upper section thereof toward two lateral sides of the upper section.

9. A hands-free mobile phone comprising:
   a housing;
   a hands-free unit;
   at least one outer slide channel being defined in one of the housing and the hands-free unit, an inner slide channel being defined inside said at least one outer slide channel, said at least one outer slide channel comprising an access hole, a pivot hole, and a coupling passage communicating the access hole with the pivot hole; and
   at least one pivot portion formed on the other of the housing and the hands-free unit, said at least one pivot portion comprising a pivot shaft and a plugging end formed on the pivot shaft, the plugging end of said at least one pivot portion being inserted in the inner slide channel through the access hole of said at least one outer slide channel and the pivot shaft thereof being placed in the corresponding access hole and slid into the pivot hole of said at least outer slide channel through the corresponding coupling passage, thereby the hands-free unit being pivotably secured to the housing via said at least one pivot portion being pivotably engaged in said at least one outer slide channel and said at least one inner slide channel.

10. The hands-free mobile phone as described in claim 9, wherein a plurality of dents is defined around said at least one pivot portion, and a plurality of projections is formed around the pivot hole of said at least one outer slide channel and movably received in the corresponding dents.

11. The hands-free mobile phone as described in claim 9, wherein a plurality of dents is defined around the pivot hole of said at least one outer slide channel, and a plurality of projections is formed around said at least one pivot portion and movably received in the corresponding dents.

12. The hands-free mobile phone as described in claim 9, wherein said at least one outer slide channel has a generally dumbbell-shaped profile.

13. The hands-free mobile phone as described in claim 12, wherein a width of the coupling passage of said at least one outer slide channel is smaller than diameters of the access hole and the pivot hole thereof.

14. The hands-free mobile phone as described in claim 13, wherein the diameter of the access hole of said at least one outer slide channel is larger than the diameter of the pivot hole thereof.

* * * * *